United States Patent
Wright et al.

(10) Patent No.: US 10,768,990 B2
(45) Date of Patent: Sep. 8, 2020

(54) PROTECTING AN APPLICATION BY AUTONOMOUSLY LIMITING PROCESSING TO A DETERMINED HARDWARE CAPACITY

(71) Applicant: International Business Machines Corporation, Armonk, NY (US)

(72) Inventors: Holly Wright, Studio Village (AU); John William Court, Carrara (AU)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/177,482

(22) Filed: Nov. 1, 2018

(65) Prior Publication Data

US 2020/0142747 A1    May 7, 2020

(51) Int. Cl.
*G06F 9/50* (2006.01)
*G06F 11/00* (2006.01)
*G06F 9/48* (2006.01)

(52) U.S. Cl.
CPC .......... *G06F 9/5044* (2013.01); *G06F 9/4856* (2013.01); *G06F 9/5016* (2013.01); *G06F 11/004* (2013.01)

(58) Field of Classification Search
CPC .................................................... G06F 9/5044
See application file for complete search history.

(56) References Cited

U.S. PATENT DOCUMENTS

| | | | |
|---|---|---|---|
| 5,140,817 A | 8/1992 | Matsuda et al. | |
| 5,381,682 A | 1/1995 | Marquardt et al. | |
| 8,719,804 B2 | 5/2014 | Jain | |
| 8,825,889 B2 | 9/2014 | Smith et al. | |
| 9,755,978 B1 | 9/2017 | Mogul et al. | |
| 10,191,778 B1 * | 1/2019 | Yang | G06F 9/45558 |
| 10,346,775 B1 * | 7/2019 | Xu | G06Q 20/145 |
| 2010/0287303 A1 | 11/2010 | Smith et al. | |
| 2011/0138463 A1 | 6/2011 | Kim et al. | |
| 2012/0216282 A1 | 8/2012 | Pappu et al. | |

(Continued)

FOREIGN PATENT DOCUMENTS

KR    20110037645    4/2011

*Primary Examiner* — Charlie Sun (74) *Attorney, Agent, or Firm* — Jeffrey S. LaBaw; David H. Judson (57) ABSTRACT

A method, apparatus and computer program to protect an application in an underlying multiprocessor computing system, e.g., one in which a processor has local memory available but can access memory assigned to other processors. In operation, a set of hardware characteristics for the underlying computing system are extracted. These characteristics preferably comprise processing power, available memory, and a topology. For each hardware characteristic, an operating limit for that characteristic is determined based at least in part on a baseline value that is determined for the application with respect to the hardware characteristic. Based on the operating limit determined for each hardware characteristic, a recommended limit for a system feature (e.g., network traffic) of the underlying computing system is computed. Thereafter, and during runtime execution of the application, the recommended limit is then enforced, e.g., by dropping excess traffic or spinning up additional application instances, to protect the application.

24 Claims, 4 Drawing Sheets

(56) References Cited

U.S. PATENT DOCUMENTS

| | | |
|---|---|---|
| 2017/0171091 A1 | 6/2017 | Nayak et al. |
| 2017/0201490 A1 | 7/2017 | Kinder et al. |
| 2018/0020016 A1 | 1/2018 | Hu et al. |
| 2019/0068693 A1* | 2/2019 | Bernat ................ H04L 43/0876 |
| 2019/0205173 A1* | 7/2019 | Gupta .................. G06F 9/5016 |

* cited by examiner

PROTECTING AN APPLICATION BY AUTONOMOUSLY LIMITING PROCESSING TO A DETERMINED HARDWARE CAPACITY

BACKGROUND

Technical Field

This disclosure relates generally to techniques to prevent application failures in a computing environment.

Background of the Related Art

To prevent failure of an application that is executing under excessive system loads, the capacity of hardware running an application must be known, such that load can be shed when offered at a rate above an available processing limit. Many applications, however, are deployed on different types of hardware and thus do not have knowledge of the specific architecture of the underlying appliance. In addition, applications often now run in virtual or cloud environments, where the actual capacity of the underlying system may change on any given reboot of the application. When the processing capabilities of the underlying hardware are unknown, or are consistently changing, it is impossible for the application to set limits that reflect hardware capacity, let alone in any type of deterministic manner. This problem is exacerbated when the application is deployed over a network (e.g., the publicly-routed Internet) that is subject to attack, such as through a Distributed Denial of Service (DDoS). Attacks of this type flood the computing system with network traffic, thereby increasing the stress on the underlying hardware architecture and significantly and further negatively impacting application performance. While known application-level DDoS attack prevention techniques attempt to address these problems, e.g., by rate limiting or filtering malformed or unexpected data packets, they have not proven satisfactory.

BRIEF SUMMARY

This disclosure describes a method, apparatus and computer program to protect an application from failure or degradation in performance as a consequence of operating conditions associated with the underlying hardware on which the application is executing. In a typical scenario, the application is executing in an underlying computing system having one or more system features (e.g., the ability to process a certain amount of network traffic, a processing or storage efficiency, an input/output performance constraint, etc.) that have configurable limits. According to the technique of this disclosure, a particular limit is determined (i.e. set) using an algorithm that executes in association with the application itself, and that takes into consideration user space-accessible information about available processing power, memory and hardware topology. Thereafter, the limit is enforced to preserve application performance.

In a representative embodiment, the application executes on a multi-processor computing system, e.g., one in which a processor has local memory available but can also access memory assigned to other processors. One such architecture is Non-Uniform Memory Access (NUMA) architecture. In operation, a set of hardware characteristics for the underlying computing system are extracted. These characteristics preferably comprise processing power, available memory, and the NUMA topology. For each hardware characteristic, an operating limit for that characteristic is determined based at least in part on a baseline value that is determined for the application with respect to the hardware characteristic. Based on the operating limit determined for each hardware characteristic, a recommended limit for a system feature (e.g., an amount of network traffic) of the underlying computing system is computed. Thereafter, and during runtime execution of the application, the recommended limit is then enforced, e.g., by dropping excess traffic, spinning up additional application instances, or the like, to protect the application. When the application is re-booted at a later time, the recommended limit for the system feature is re-computed anew to compensate for any changes in processor, memory or topology of the underlying computing system.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

By way of background, a logically-partitioned computational machine allows system resources such as CPUs, memory and input/output (I/O) hardware to be assigned to one or more logical partitions or containers. In modern dynamically-partitioned machine environments, partitions can be reconfigured without having to reboot, allowing CPU, memory and I/O resources to be added to, deleted from, or moved between running partitions. Dynamic logical partitioning has been implemented in NUMA (Non-Uniform Memory Access) machines wherein interconnected NUMA hardware nodes share memory and I/O resources.

Non-Uniform Memory Access (NUMA) refers to multi-processor systems whose memory is divided into multiple memory nodes. The access time of a memory node depends on the relative locations of the accessing CPU and the accessed node. Normally, each CPU on a NUMA system has a local memory node whose contents can be accessed faster than the memory in the node local to another CPU or the memory on a bus shared by all CPUs. NUMA is used in multiprocessor systems on x86 and IBM® POWER® architecture platforms. As noted, in a system that has NUMA characteristics, each processor has local memory available, but can access memory assigned to other processors. More generally, a NUMA node is a collection of processors and memory that are mutually close, and memory access times within a node are faster than outside of a node.

Figure 1:
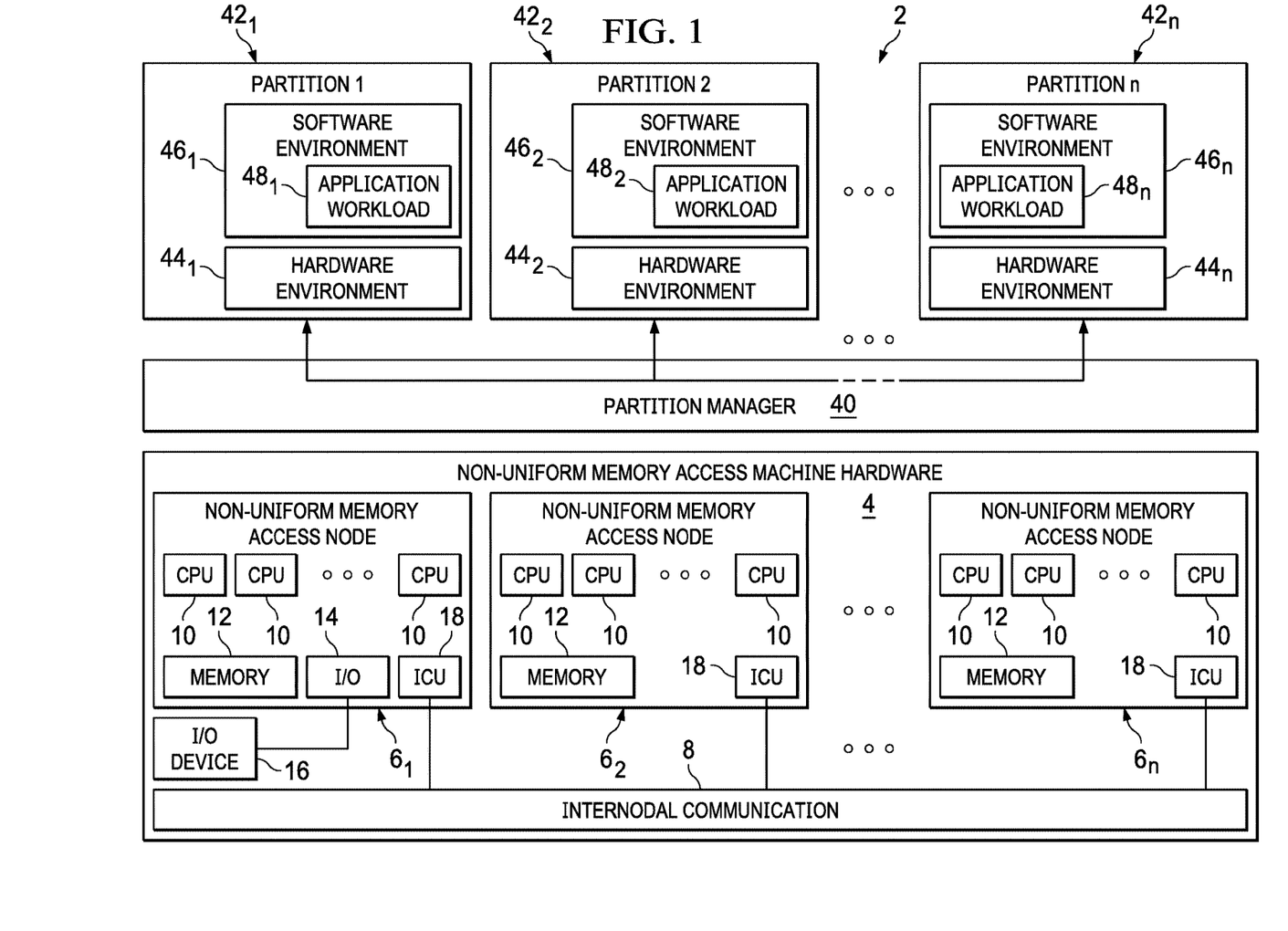
FIG. 1 depicts a functional block diagram shown an example NUMA machine comprising NUMA machine hardware that is logically partitioned.

Referring to FIG. 1, a dynamic logically-partitioned NUMA (Non-Uniform Memory Access) machine 2 may be built using a plurality of data processing system components that collectively provide the hardware 4 of the NUMA machine. The NUMA machine hardware 4 comprises a set of two or more NUMA nodes 6 (shown individually as nodes $6_1, 6_2 \ldots 6_n$) that interoperate across an internodal communication system 8 comprising one or more (depending on the number of NUMA nodes) internodal communication links. The internodal communication system 8 may be implemented using any suitable electrical, optical or wireless technology, and may comprise any number of topologies, from dedicated point-to-point connections, to single switch implementations (e.g., using a cross-bar switch), to packet or circuit switched networks of varying complexity, or to combinations thereof.

Typically, each NUMA node 6 contains one or more CPUs (Central Processing Units) 10 and associated memory circuitry 12. Some of the NUMA nodes, such as node $6_1$, may further contain at least one input/output (I/O) controller 14 and one or more I/O device resources 16. The I/O controller 14 may be implemented in conventional fashion as part of a circuit board chipset. Example I/O resources 16 include, but are not limited to, disk drives, tape drives, other storage devices, storage systems and storage subsystems, network links, USB devices, printers, keyboard and mouse input devices, and output devices such as display monitors. Each NUMA node 6 further contains a nodal interconnect unit (ICU) 18 that interfaces the nodes to the internodal communication system 8. The interconnect unit 18 may be implemented using conventionally available circuitry for communicating information between nodes.

The NUMA machine hardware 4 allows each CPU 10 of each NUMA node 6 to access the memory 12 (and optionally the I/O resources 16) of other NUMA nodes using a single shared address space. As such, the memory 12 and the I/O resources 16 may be thought of as examples of shared addressable hardware resources that are shared between the nodes 6. Conventional hardware and/or software support may be provided for maintaining memory coherence between the NUMA nodes 6. The ability to perform both local and remote memory and I/O accesses enables the NUMA machine hardware 4 with non-uniform memory access characteristics, assuming there are latency differences between the local and remote accesses. Generalizing, any shared memory data processing system (or distributed shared memory system) exhibiting differential local and remote memory and I/O access latencies may be considered to have non-uniform memory access characteristics for purposes of the present disclosure. The actual latency differences may be quite small (even negligible), or they may vary by orders of magnitude. This will depend on the circuit components used to implement the NUMA machine architecture, and it will also be affected by the NUMA machine topology and the distances between NUMA nodes, which could range from inches to thousands of miles.

As also shown in FIG. 1, a partition manager 40 operates within the NUMA machine 4 to provide a set of logical partitions 42 (shown individually as partitions $42_1, 42_2 \ldots 42_n$). The logical partitions 42 provide corresponding hardware environments 44 (shown individually as hardware environments $44_1, 44_2 \ldots 44_n$ and software environments 46 (shown individually as software environments $46_1, 46_2 \ldots 46_n$) for running various application workloads 48 (shown individually as application workloads $48_1, 48_2 \ldots 48_n$). The partition manager 40 may be implemented using a conventional virtual machine monitor (VMM) or hypervisor. Well known examples of commercial VMMs include, but are not limited to, the dynamically configurable PowerVM® virtualization system available in IBM® System p® server products. As is conventionally known, a VMM provides a low level service that virtualizes the underlying hardware to provide a subset of CPU, memory and I/O resources (i.e., a virtual machine partition) on behalf of higher level "guests." A VMM embodiment of the partition manager 40 thus provides the hardware environments 44 of the partitions 42 by allocating CPU bandwidth, memory and I/O resources from the NUMA nodes 6 of the NUMA machine hardware 4. Within the partitions 42, the application workloads 48 behave as if they are running on separate hardware systems that each comprise the assigned hardware resources.

Each the software environments 46 may include associated operating system instances (not shown) that support the application workloads 48. The partition manager 40 then interoperates between such operating systems and the bare NUMA machine hardware 4. This is known in the art as whole system-level virtualization, with each partition representing a virtual machine that executes a separate operating system instance. Alternatively, the partition manager 40 is implemented by an operating system and the software environments 46 comprise application containers. This is known in the art as operating system-level virtualization.

The partition manager 40 supports conventional dynamic logical partitioning, meaning that the partitions 42 can be dynamically reconfigured at runtime. This may be accomplished by adding unallocated hardware resources to partitions, removing hardware resources from partitions and returning them to unallocated status, or by moving hardware resources between partitions. The hardware resources that may be allocated among the partitions 42 include the CPUs (or CPU time slices if micro-partitioning is supported), memory and I/O resources within any of the NUMA nodes 6. For virtualization products such as the IBM® PowerVM® system, dynamic logical partitioning further includes the ability to migrate partitions across NUMA machines within a cloud or cluster of NUMA machines.

The above-described NUMA-based multi-processor hardware computing environment, as well as the commercial products identified, are merely representative. Further, the particular nature of the application (or application workload) executing on the hardware computing environment is also not intended to be limiting, as the techniques herein may be used with any application and underlying computing system.

Figure 3:
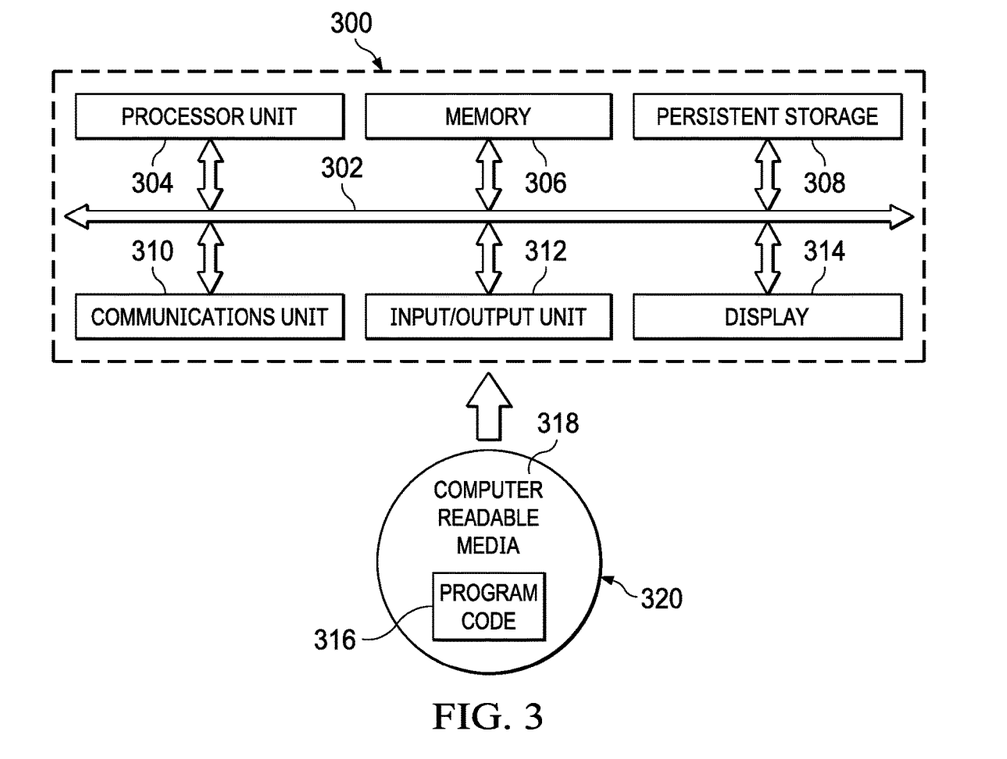
FIG. 3 is an exemplary block diagram of a data processing system in which exemplary aspects of the illustrative embodiments may be implemented.

With reference now to FIG. 3, a block diagram of an exemplary data processing system is shown in which aspects of the illustrative embodiments may be implemented. Data processing system 300 is an example of a computer in which computer usable code or instructions implementing the processes for illustrative embodiments of the disclosure may be located. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor (SMP) system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 200. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer-usable program code, or computer-readable program code that may be read and executed by a processor in processor unit 304. The program code in the different embodiments may be embodied on different physical or tangible computer-readable media, such as memory 306 or persistent storage 308.

Program code 316 is located in a functional form on computer-readable media 318 that is selectively removable and may be loaded onto or transferred to data processing system 200 for execution by processor unit 304. Program code 316 and computer-readable media 318 form computer program product 320 in these examples. In one example, computer-readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer-readable media 318 also may take the form of a persistent storage, such as a hard drive, a thumb drive, or a flash memory that is connected to data processing system 300. The tangible form of computer-readable media 318 is also referred to as computer-recordable storage media. In some instances, computer-recordable media 318 may not be removable.

Alternatively, program code 316 may be transferred to data processing system 200 from computer-readable media 318 through a communications link to communications unit 310 and/or through a connection to input/output unit 312. The communications link and/or the connection may be physical or wireless in the illustrative examples. The computer-readable media also may take the form of non-tangible media, such as communications links or wireless transmissions containing the program code. The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. As one example, a storage device in data processing system 300 is any hardware apparatus that may store data. Memory 306, persistent storage 308, and computer-readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A data processing system such as depicted in FIG. 3 includes operating system software, such as a modern Linux kernel. A Linux kernel comprises utility functions that are useful in monitoring the performance of hardware and other computing resources used by or in association with the kernel. One such measure, albeit one that is recognized as being unscientific, is referred to as BogoMIPS (for "bogus" millions of instructions per second). This is a measure of CPU speed made by the Linux kernel when it boots to calibrate an internal busy-loop. BogoMIPS is a value that can be used to verify whether the processor in question is in the proper range of similar processors. As will be described below, a BogoMIPS measure is useful in the algorithm of this disclosure.

Cloud Computing Model

The technique of this disclosure may be used to protect an application executing in a cloud computing environment. Thus, the following additional background regarding cloud computing is provided.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "The NIST Definition of Cloud Computing" by Peter Mell and Tim Grance, September 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 2:
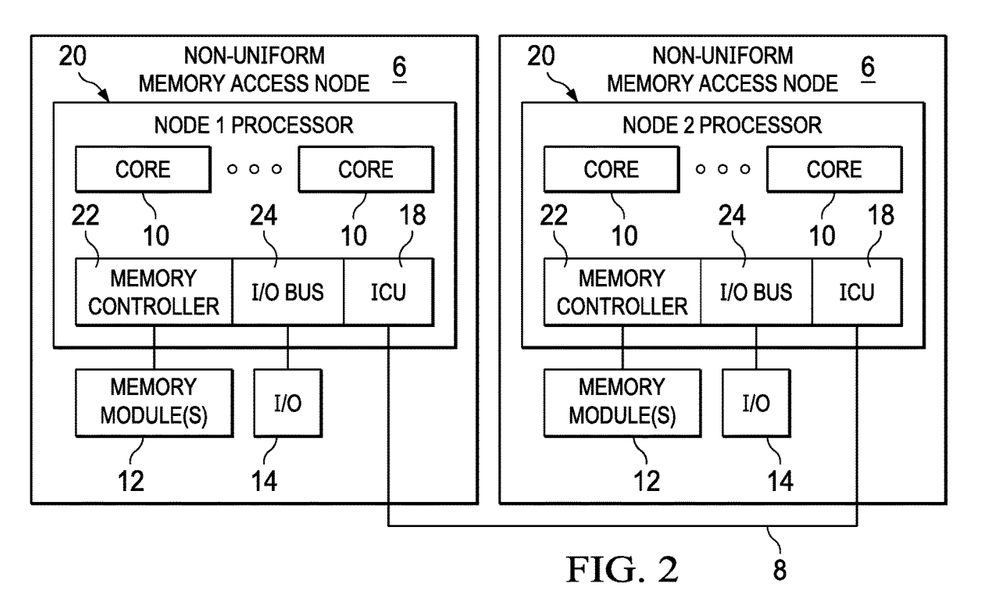
FIG. 2 depicts a functional block diagram showing one example configuration of NUMA machine hardware of FIG. 1.

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

In a typical cloud computing environment, a set of functional abstraction layers are provided. These include a hardware and software layer, a virtualization layer, a management layer, and a workload layer.

The hardware and software layer includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

The virtualization layer provides an abstraction layer from which the following examples of virtual entities may be provided: virtual servers; virtual storage; virtual networks, including virtual private networks; virtual applications and operating systems; and virtual clients.

The management layer provides various management functions. For example, resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

The workloads layer provides the functionality for which the cloud computing environment is utilized.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
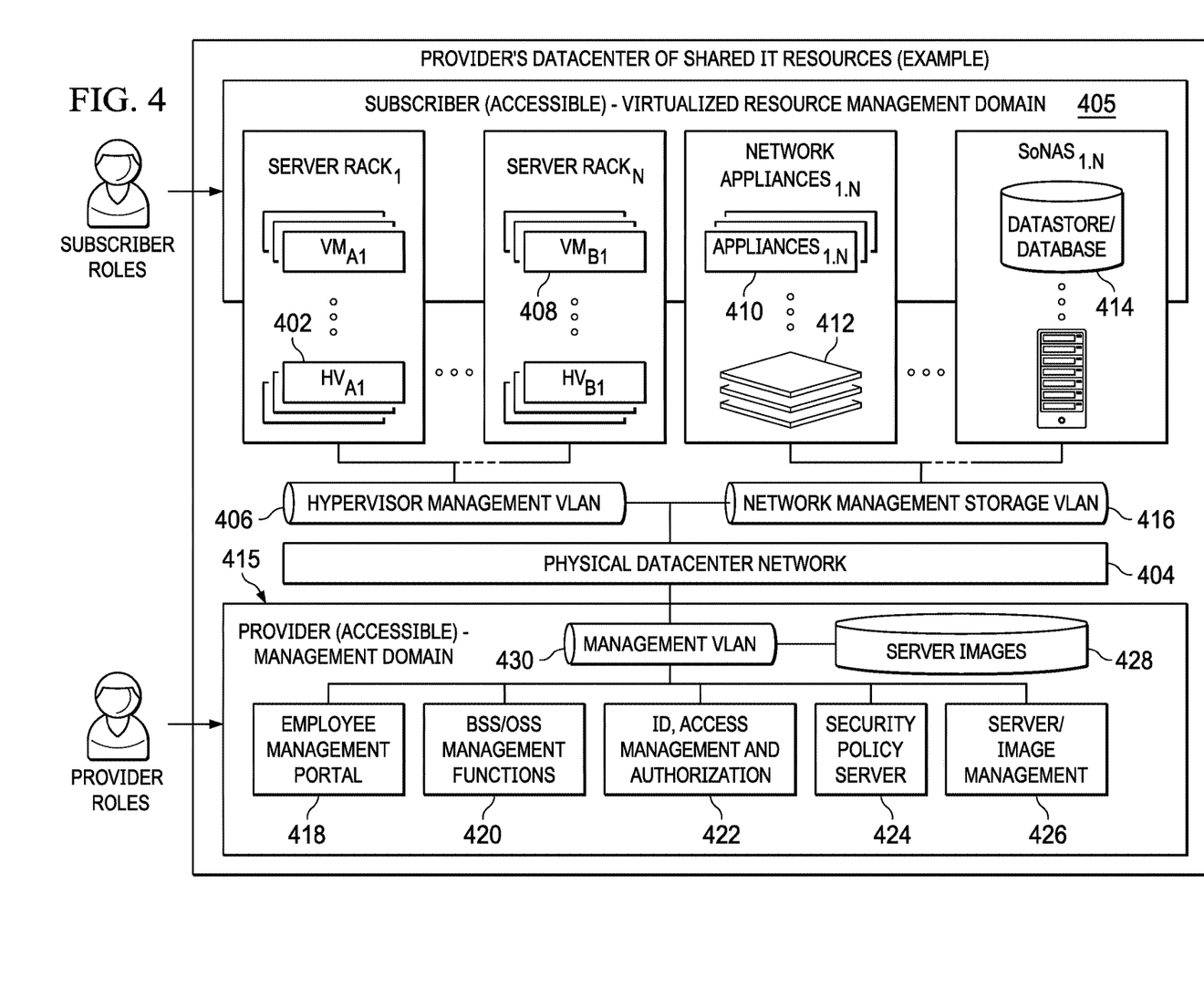
FIG. 4 depicts a data center that includes a cloud compute infrastructure that may implement the application protection technique of this disclosure.

FIG. 4 illustrates a typical IT infrastructure that supports virtualization of resources and in which the database server(s) are typically housed. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Protecting an Application by Autonomously Limiting Processing to Hardware Capacity As described above, the techniques of this disclosure are used to protect an application from failure or degradation in performance as a consequence of operating conditions associated with the underlying hardware on which the application is executing. In a typical operating scenario, the application is executing in an underlying computing system having one or more system features (e.g., the ability to process a certain amount of network traffic, a processing or storage efficiency, an input/output performance constraint, etc.) that have configurable limits. For illustrative purposes only, the remainder of this description uses "network traffic" as the system feature constraint in question, although this is not a limitation.

According to the technique of this disclosure, a particular limit is determined (i.e. set), preferably using an algorithm that executes in association with the application itself. In particular, the algorithm preferably takes into consideration information that the application is able to obtain or access (i.e., user space-accessible data) about available processing power, memory and hardware topology with respect to the underlying computing system. Thereafter, the system feature limit is enforced to preserve application performance.

As will be described, the technique herein may be used with any application executing on a computing system, e.g., a system that receives network traffic and thus is susceptible to attack, such as by a Distributed Denial of Service (DDoS). Preferably, the technique herein is implemented in an algorithm that runs in the application itself, and that is used at start up (or other initialization) of the application for the purpose of setting a network traffic limit (when network traffic is used as the system feature in question). The algorithm may also be implemented to execute in close association with the application in the event it is not implemented within the application itself. The algorithm is implemented as a computer program, i.e., a set of computer program instructions executing in a data processing system such as depicted in FIG. 3.

Preferably, the algorithm leverages a set of specific host properties that are monitored, and its sets a traffic limit based on these properties. As noted above, typically the application executes in a multi-processor system and, in a preferred embodiment, a system that implements Non-Uniform Memory Access (NUMA), with working memory divided across multiple memory nodes. Representative host properties include available memory, CPU and NUMA topology. As will be seen, the algorithm is used to set a network traffic limit based on these properties.

Preferably, the algorithm uses information about the NUMA topology, the number of BogoMIPS per NUMA node, and the available memory per CPU core on each NUMA node. The NUMA topology of a system has an impact on the amount of load it will be able to process. In addition to processing and memory constraints, accesses to the memory in other NUMA nodes is costly, and decreases performance. The likelihood of needing to access memory on another node, plus a cost of doing so, thus provides useful data for consideration in a calculation of the hardware traffic limit. Likewise, BogoMIPS, which provides a measurement proportional to clock rate, is useful as an upper bound benchmark for CPU capability. Further, it is a universal measurement on all Linux systems, and its value is available to user space programs. As such, it can be used to provide an indication of the CPU capacity on systems where the specific architecture is unknown and needs to be determined by a user space application. As will be seen, in the preferred embodiment, the algorithm compares NUMA and BogoMIPS values to a baseline set of values, the latter preferably taken from a system running under no load, with a known or measurable traffic throughput capacity. Based on these comparisons, a recommended input limit for the system feature (in this example, a network traffic limit) is then set and enforced for this hardware configuration, preferably by scaling the limit in accordance with the comparative hardware capacity of the known baseline. The computations are then repeated as necessary, e.g., upon a change in the underlying hardware configuration or operating capabilities.

Figure 5:
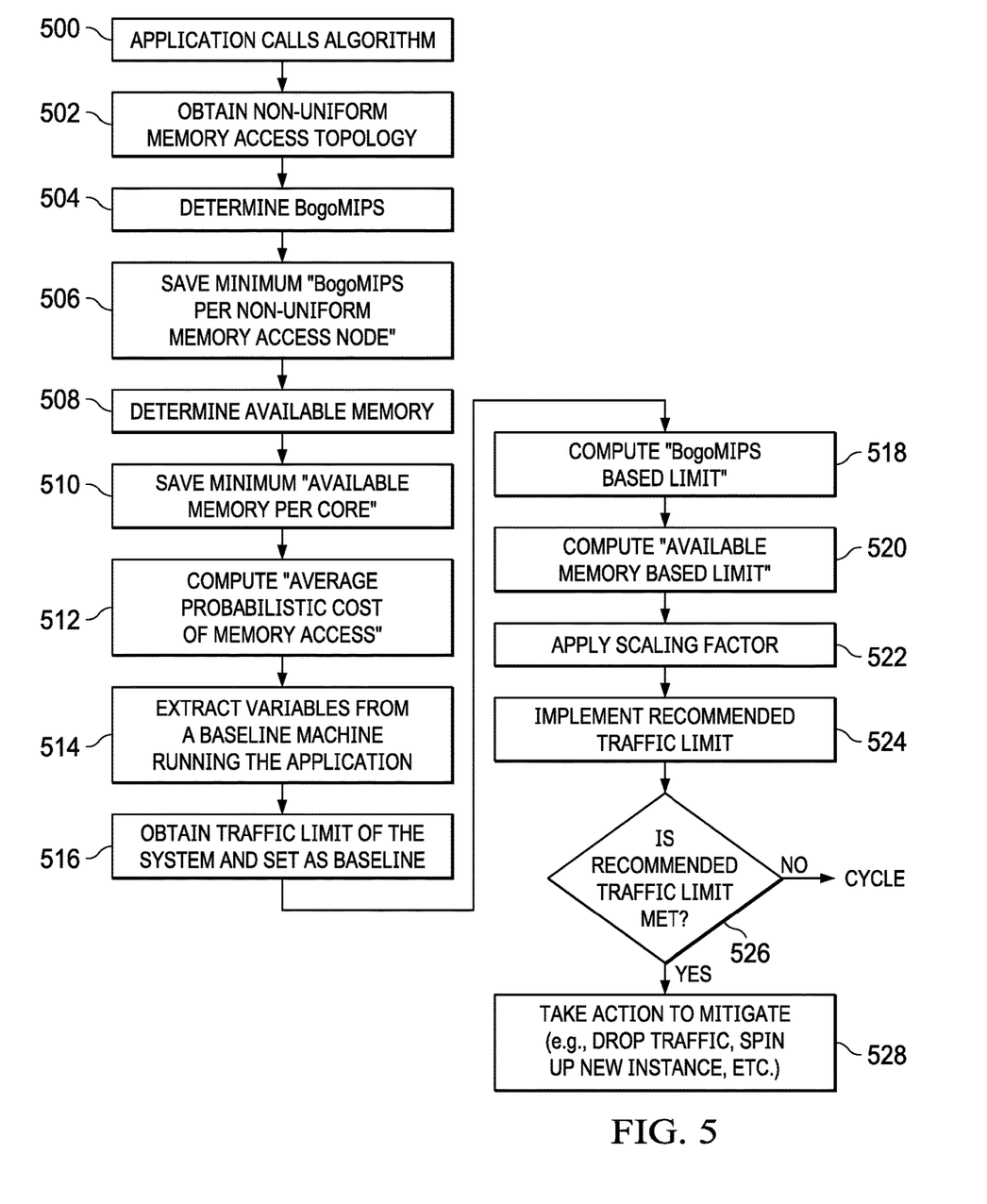
FIG. 5 depicts a process flow of the technique of this disclosure.

FIG. 5 depicts a process flow of an embodiment of this disclosure. In this embodiment, the system feature is network traffic, and this example (which is not intended to be limiting) demonstrates how the technique implements a traffic limit that mitigates the impact of a DDOS attack.

The routine begins at step 500, e.g., with the application issuing a call to start the functionality. Without intending to be limiting, the subject matter herein is implemented as one or more computer programs or processes, i.e., as a set of computer instructions. The particular functions described below in FIG. 5 may be implemented across one or more computers, in different sequences or ordering, and at different times.

Before receiving any traffic, the NUMA topology is observed at step 502, preferably by running a numactl-H command on the hardware. As is known, the numactl utility is a Linux OS utility that is used to control NUMA policy for processes or shared memory. For each NUMA node, the routine then continues at step 504 by taking the list of cores identified and reading the/proc/cpuinfo file, summing up the value of "bogomips" for the entire list of cores. This file is short, read-only, plaintext file that contains information about the CPUs on a computer; it is read with a Linux OS command such as cat, i.e., cat/proc/cpuinfo. This operation gives the "bogomips per NUMA node" and, at step 506, the minimum of these values is selected/maintained. The routine then continues at step 508. Then, and for each NUMA node in the numactl message, the algorithm takes the amount of free memory and divides by the number of cores in that node. Step 508 thus computes an "available memory per core (MB)" value. Only the minimum of these values is required. At step 510, the minimum of these values is selected/maintained. The routine then continues at step 512 to compute an "average probabilistic cost of memory access." Preferably, this is determined by taking a node distance matrix (which is otherwise available or capable of being retrieved) and multiplying each entry therein by a likelihood (probability) that such an access is required. Typically, this probability is calculated externally (e.g., by the system or other data source), and it reflects how often both local and remote memory accesses are required. One technique for determining such a probability may be implemented by observing a percentage of accesses from one node to another on the running system. After the probabilistic cost is calculated for each of these links, the average is taken as the "average probabilistic cost of a memory access" to complete step 512.

With the above-described information determined, the routine then continues at step 514. At this step, "bogomips per NUMA node," "available memory per core (MB)" and "average probabilistic cost of memory access" are extracted from a baseline machine that is running the same application under no load. In the example traffic limiting scenario, this means that the application is not yet receiving any traffic. These values are referred to hereinafter as the "baseline" values. The absolute traffic limit of the system (in which the baseline machine executes) is also known or obtained and, at step 516, this traffic limit is set as a "baseline traffic limit."

At step 518, the "bogomips per NUMA node" value is then compared to the "baseline bogomips per NUMA node." A "bogomips based limit" is computed by the following: "baseline traffic limit'×("bogomips per NUMA node"/"baseline bogomips per NUMA node").

At step 520, the "available memory per core (MB)" value is then compared to the "baseline available memory per core (MB)." An "available memory based limit" is computed by the following: "baseline traffic limit"×("available memory per core (MB)"/"baseline available memory per core (MB)").

At step 522, the minimum of the bogomips based limit (determined at step 506) and available memory based limit (determined at step 510) is then taken and multiplied by a scaling factor. While only one of the minimums need be used, this is not a limitation, as both minimums may be used in the calculation. This scaling factor preferably is calculated by taking the "baseline average probabilistic cost of a memory access"/"average probabilistic cost of a memory access." This scaling factor is designed to account for the fact that performance suffers for systems that require lots of accesses to memory on nodes that are far apart. Other scaling factors may be implemented as well.

After applying the scaling factor, a recommended traffic limit has been determined. At step 524, the recommended traffic limit is implemented, e.g., in a security device that monitors network traffic. The recommended traffic limit may be any characteristic of the traffic (e.g., flows, bytes, packets, etc.) that is capable of being monitoring. At step 526, a test is performed to determine whether the recommended traffic limit (either absolutely or within some configurable range) has been met. If the outcome of the test at step 526 is negative, the routine cycles. If, however, the outcome of the test at step 526 is positive, the routine continues at step 528 to take a given mitigation action. Representative actions are dropping traffic (to ensure the limit is not exceeded), spinning up one or more additional instances of the application and balancing additional traffic across those instances, and the like.

Thus, according to the technique of this disclosure, a set of host computing system values (e.g., processor power, available memory, network topology) are obtained. These values are compared to a baseline set of values, taken from a system under no load, with a known or measurable traffic throughput capacity. Based on these computations, a recommended input limit is then set for this hardware, preferably by scaling the limit in accordance with the comparative hardware capacity of the known baseline. As a skilled person will appreciate, the approach herein sets a system safeguard that prefers input loss (such as dropping traffic) rather than system failure. Further, and in one preferred approach, the above-described hardware characteristics (namely, NUMA topology, BogoMIPS, etc.) are all accessible from user space. As such, even a platform that does not have well-defined processing capabilities can still be protected (e.g., from DDOS attacks) by implementing a traffic limit using this algorithm. Preferably, the traffic limit is determined and set autonomously on startup, and without requiring user intervention. This feature is of particular value in a virtual or cloud environment where machine capacity often is externally changed from one boot cycle to the such that any system install time calculations are not useful.

Although hardware characteristics are preferably extracted from user-space, this is not a requirement or limitation of the disclosed technique. Hardware characteristics (or whole or in part) may also be extracted from kernel space or otherwise by the operating system.

Although the above-described combination of hardware characteristics (used to set system limits) are preferred, the approach herein of capturing host system characteristics preferably from application space and then using such information to set a system feature operating limit) can rely on a different set of characteristics. Regardless of which set of hardware characteristics are leveraged, the computed limit is a direct reflection of a best possible processor capability of the system on which the program is running, as opposed to some predetermined limit that does not necessarily reflect the current hardware or virtual environment.

The technique herein provides significant advantages. In particular, it solves the problem of excess traffic load impacting application performance at the application level. The approach herein is efficient and simple to implement, as the resource consumption of one or more hosts is evaluated from an application space and then used to implement traffic limiting. The approach leverages the hardware characteristics evaluated by the algorithm to limit the incoming traffic at the application level, rather than via a management server. To dynamically set the traffic limit preferably from the application space during application runtime, the NUMA topology, BogoMIPS and available memory are extracted from the underlying hardware, preferably using operating system kernel operations. These values (or at least some of them) are then used in the algorithm to recommend a traffic limit for the application. This recommended limit is then used to mitigate the effect of a DDOS attack, e.g., by dropping traffic after this limit, or to enable autonomous scaling by spinning up more application instances. The approach mitigates impact of a DDOS attack and thereby improves application performance. Further, because the technique preferably is implemented from within application (user) space, it allows for application developers to configure traffic distribution and limiting at the application level.

Generalizing, the technique herein may be used with an application that processes traffic and is susceptible to DDoS attack. Further, it is not required that the technique be implemented in an underlying NUMA-based computing system, although this will be the typical case.

As noted, the above-described algorithm or computations are not intended to be limited but, rather, are merely provided as an example scenario of how the host processor, memory and/or topology measurements are carried out with respect to a multi-processor NUMA-based system. Different host properties (or sets of properties) may be used as inputs to the algorithm, and it is not required that both CPU capacity and available memory be used in the computation. Thus, for example, in cases where processing traffic is not memory intensive, the "available memory" need not be included in the algorithm for determining a traffic limit. In a further variant, by comparing limits determined from each of the processor capacity and available memory values, a "safer" limit can be set as the smaller of the two. Further, it is not required that the average probabilistic cost of memory access by utilized as a scaling factor in the computation.

The approach herein also may be implemented in an application handling layer, in a virtual machine or container handling the application, or in the host operating system.

This subject matter may be implemented in whole or in part as-a-service. The functionality may be provided as a standalone function, or it may leverage functionality from other network-based products and services.

The approach herein is designed to be implemented in an automated manner within or in association with a security system, such as a SIEM.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for technology improvements to systems that manage application performance, as well as providing improvements to another technology or technical field, e.g., security incident and event management (SIEM) systems, and other network- or enterprise-based security systems.

The DDOS mitigation use case described above is not intended to be limiting. The approach herein may be used for other purposes, such as enforcing licensing or use-based accounted based memory/compute usage, load balancing and scaling, performance measurements and reporting for applications (i.e., reporting on the memory and compute usage of applications), health checks for infrastructure (i.e., monitoring the usual results of running the algorithm and alerting on material changes), and others.

Having described the invention, what we claim is as follows:

1. A method to protect an application, comprising:
   extracting a set of hardware characteristics for an underlying computing system, the set of hardware characteristics comprising processing power, memory, and a topology;
   for each hardware characteristic of the set of hardware characteristics, determining an operating limit based at least in part on a baseline value determined for the application with respect to the hardware characteristic;
   computing a recommended limit for a system feature of the underlying computing system based on the operating limits determined for each of the hardware characteristics; and
   during runtime execution of the application, enforcing the recommended limit for the system feature to protect the application.

2. The method as described in claim 1 wherein the extracting, determining and computing operations are implemented by the application upon initialization.

3. The method as described in claim 2 further including computing a new recommended limit for the system feature upon a subsequent initialization of the application, the new recommended limit based at least in part on a change in a hardware characteristic.

4. The method as described in claim 1 wherein the topology is a Non-Uniform Memory Access (NUMA) topology.

5. The method as described in claim 4 wherein the operating limit for processing power is derived from a number of BogoMIPS per NUMA node, the operating limit for memory is derived from an available memory per CPU core on each NUMA node, and the recommended limit is based on the number of BogoMIPS per NUMA node, the available memory per CPU core on each NUMA node, and a scaling factor derived from an average probabilistic code of an access from a NUMA node.

6. The method as described in claim 1 wherein the system feature is network traffic.

7. The method as described in claim 6 wherein enforcing the recommended limit is one of: dropping network traffic once the recommended limit for network traffic is reached, and starting one or more additional instances of the application.

8. An apparatus, comprising:
a hardware processor;
computer memory holding computer program instructions executed by the hardware processor to protect an application, the computer program instructions configured to:
extract a set of hardware characteristics for an underlying computing system on which the application will execute, the set of hardware characteristics comprising processing power, memory, and a topology;
for each hardware characteristic of the set of hardware characteristics, determine an operating limit based at least in part on a baseline value determined for the application with respect to the hardware characteristic;
compute a recommended limit for a system feature of the underlying computing system based on the operating limits determined for each of the hardware characteristics; and
during runtime execution of the application, enforce the recommended limit for the system feature to protect the application.

9. The apparatus as described in claim 8 wherein the computer program instructions configured to extract, determine and compute are implemented by the application upon initialization.

10. The apparatus as described in claim 9 wherein the computer program instructions are further configured to compute a new recommended limit for the system feature upon a subsequent initialization of the application, the new recommended limit based at least in part on a change in a hardware characteristic.

11. The apparatus as described in claim 8 wherein the topology is a Non-Uniform Memory Access (NUMA) topology.

12. The apparatus as described in claim 11 wherein the operating limit for processing power is derived from a number of BogoMIPS per NUMA node, the operating limit for memory is derived from an available memory per CPU core on each NUMA node, and the recommended limit is based on the number of BogoMIPS per NUMA node, the available memory per CPU core on each NUMA node, and a scaling factor derived from an average probabilistic code of an access from a NUMA node.

13. The apparatus as described in claim 8 wherein the system feature is network traffic.

14. The apparatus as described in claim 13 wherein the computer program instructions configured to enforce the recommended limit are configured to drop network traffic once the recommended limit for network traffic is reached, or to start one or more additional instances of the application once the recommended limit for network traffic is reached.

15. A computer program product in a non-transitory computer readable medium for use in a data processing system to protect an application, the computer program product holding computer program instructions that, when executed by the data processing system, are configured to:
extract a set of hardware characteristics for an underlying computing system on which the application will execute, the set of hardware characteristics comprising processing power, memory, and a topology;
for each hardware characteristic of the set of hardware characteristics, determine an operating limit based at least in part on a baseline value determined for the application with respect to the hardware characteristic;
compute a recommended limit for a system feature of the underlying computing system based on the operating limits determined for each of the hardware characteristics; and
during runtime execution of the application, enforce the recommended limit for the system feature to protect the application.

16. The computer program product as described in claim 15 wherein the computer program instructions configured to extract, determine and compute are implemented by the application upon initialization.

17. The computer program product as described in claim 16 wherein the computer program instructions are further configured to compute a new recommended limit for the system feature upon a subsequent initialization of the application, the new recommended limit based at least in part on a change in a hardware characteristic.

18. The computer program product as described in claim 15 wherein the topology is a Non-Uniform Memory Access (NUMA) topology.

19. The computer program product as described in claim 18 wherein the operating limit for processing power is derived from a number of BogoMIPS per NUMA node, the operating limit for memory is derived from an available memory per CPU core on each NUMA node, and the recommended limit is based on the number of BogoMIPS per NUMA node, the available memory per CPU core on each NUMA node, and a scaling factor derived from an average probabilistic code of an access from a NUMA node.

20. The computer program product as described in claim 15 wherein the system feature is network traffic.

21. The computer program product as described in claim 20 wherein the computer program instructions configured to enforce the recommended limit are configured to drop network traffic once the recommended limit for network traffic is reached, or to start one or more additional instances of the application once the recommended limit for network traffic is reached.

22. The method as described in claim 1 wherein the set of hardware characteristics are extracted from user space.

23. The apparatus as described in claim 8 wherein the set of hardware characteristics are extracted from user space.

24. The computer program product as described in claim 15 wherein the set of hardware characteristics are extracted from user space.

* * * * *